(12) United States Patent
Katsuda

(10) Patent No.: US 12,304,417 B2
(45) Date of Patent: May 20, 2025

(54) GAS GENERATOR AND AIRBAG DEVICE

(71) Applicant: Daicel Corporation, Osaka (JP)

(72) Inventor: Nobuyuki Katsuda, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 0 days.

(21) Appl. No.: 18/732,250

(22) Filed: Jun. 3, 2024

(65) Prior Publication Data

US 2024/0317172 A1    Sep. 26, 2024

Related U.S. Application Data

(63) Continuation of application No. PCT/JP2022/034366, filed on Sep. 14, 2022.

(30) Foreign Application Priority Data

Dec. 3, 2021    (JP) ................................. 2021-196784

(51) Int. Cl.
    *B60R 21/264*    (2006.01)
(52) U.S. Cl.
    CPC ................................ *B60R 21/2644* (2013.01)
(58) Field of Classification Search
    CPC ... B60R 21/262; B60R 21/276; B60R 21/261; B60R 21/2644
    See application file for complete search history.

(56) References Cited

U.S. PATENT DOCUMENTS

| | | | | |
|---|---|---|---|---|
| 5,269,561 | A | * | 12/1993 | Davis .................. F42B 3/04 280/736 |
| 5,564,738 | A | * | 10/1996 | Johnson ............... B60R 21/276 280/736 |
| 2008/0131631 | A1 | * | 6/2008 | Huber ................... B60R 21/26 428/34.1 |
| 2008/0143088 | A1 | * | 6/2008 | Yamazaki ........... B60R 21/2644 280/739 |

FOREIGN PATENT DOCUMENTS

| | | | | |
|---|---|---|---|---|
| DE | 20311254 | U1 * | 1/2004 | ......... B60R 21/2171 |
| DE | 202005008847 | U1 * | 11/2005 | ............. B60R 21/26 |
| DE | 202005017267 | U1 * | 4/2006 | ............. B60R 21/23 |
| DE | 102009022326 | A1 * | 12/2009 | ........... B60R 21/276 |

OTHER PUBLICATIONS

International Search Report and Written Opinion mailed on Oct. 18, 2022, received for PCT Application PCT/JP2022/034366, filed on Sep. 14, 2022, 13 pages including English Translation.

* cited by examiner

*Primary Examiner* — James A English
(74) *Attorney, Agent, or Firm* — XSENSUS LLP

(57) ABSTRACT

In a gas generator, a plurality of gas discharge ports include a plurality of first gas discharge ports and one or a plurality of second gas discharge ports having an opening pressure higher than an opening pressure of the first gas discharge ports. An opening pressure of the first and second gas discharge ports are set, such that only the plurality of first gas discharge ports of the plurality of gas discharge ports are opened by the pressure of the gas when the igniter is actuated in a stand-alone state before the gas generator is incorporated into an airbag device, and among the plurality of gas discharge ports, the first gas discharge ports excluding some of the first gas discharge ports and at least some of the second gas discharge ports are opened by the pressure of the gas when the igniter is actuated in an assembled state.

14 Claims, 19 Drawing Sheets

FIG. 19

GAS GENERATOR AND AIRBAG DEVICE

CROSS-REFERENCE TO RELATED APPLICATIONS

The present application is a Continuation of International Patent Application No. PCT/JP2022/034366 filed on Sep. 14, 2022, which contains subject matter related to Japanese Patent Application No. 2021-196784 filed in the Japan Patent Office on Dec. 3, 2021, the entire contents of each are incorporated herein by reference.

TECHNICAL FIELD

The present invention relates to a gas generator and an airbag device including the gas generator.

BACKGROUND ART

In the related art, a gas generator is widely used that is integrated in an airbag device and supplies gas to an airbag for inflating the airbag. A gas generator that accommodates an igniter and a gas generation source in a housing is known. The gas generator generates gas from the gas generation source when the igniter is actuated, and discharges the gas to the outside from a plurality of gas discharge ports formed in the housing.

The gas discharge ports are closed by a closing member prior to actuation of the igniter. When the igniter is actuated and the closing member is ruptured by the pressure of the gas generated by the gas generation source, the gas discharge ports are opened. Accordingly, gas is discharged from the inside of the housing. In some cases, there is a demand for a gas generator to have thrust neutrality when all the gas discharge ports are opened and the gas is discharged. This is to prevent the gas generator from flying by the thrust acting on the gas generator by the discharge of the gas in a case of a fire or an accidental ignition (unexpected ignition) in an event such as an igniter malfunction prior to incorporation of the gas generator into an airbag device, that is, in a stand-alone state of the gas generator. On the other hand, in a state in which the gas generator is incorporated in the airbag device, with the aim of quickly inflating the airbag, the gas discharged from the gas generator may need to be deflected in a specific direction.

In this regard, Patent Document 1 discloses a technique related to an airbag device using a gas generator. In the gas generator of Patent Document 1, a plurality of gas discharge ports are evenly disposed in a peripheral wall of a housing, and when the gas generator operates in the stand-alone state, all of the gas discharge ports are opened, and thus, the gas generator is thrust neutral. In the airbag device of Patent Document 1, some gas discharge ports of the gas discharge ports of the gas generator incorporated in the airbag device are covered by a deflector element, and thus, the some gas discharge ports of the gas discharge ports are prevented from opening. Accordingly, when the gas generator incorporated in the airbag device is actuated, the gas is discharged from the remaining gas discharge ports, and thus, the gas escapes from one side, and the gas is deflected to a predetermined direction.

CITATION LIST

Patent Document

Patent Document 1: US 2008/0131631 A

SUMMARY OF INVENTION

Technical Problem

In general, an output performance of a gas generator corresponds to the sum of opening areas of gas discharge ports that open when the igniter is actuated. In the related art described above, all the gas discharge ports are opened when the gas generator operates in the stand-alone state, and only some gas discharge ports of the gas discharge ports are opened when the gas generator operates in a state in which the gas generator is incorporated in an airbag device. Therefore, the sum of the opening areas of the gas discharge ports differs between the stand-alone state of the gas generator and the state in which the gas generator is incorporated in the airbag device. Accordingly, in the above-described gas generator, there is a difference in the output performance between the stand-alone state of the gas generator and the state in which the gas generator is incorporated in the airbag device. In general, a gas generator is designed under consideration of the output performance in a case in which all gas discharge ports are opened, that is, a case where the gas generator operates in a stand-alone state. Therefore, it is required to reduce the difference in output performance between the stand-alone state of the gas generator and the state where the gas generator is incorporated in an airbag device.

The technique of the present disclosure has been made in view of the above-described problems, and an object thereof is to provide, in a gas generator used in an airbag device, a technique that enables reduction of a difference in output performance between a stand-alone state of the gas generator and a state in which the gas generator is incorporated in the airbag device.

Solution to Problem

To solve the above problem, the technique of the present disclosure adopts the following configuration. That is, in the technique of the present disclosure, a gas generator which is configured to be incorporated in an airbag device and to supply gas to an airbag for inflating the airbag is provided; the gas generator includes an igniter, a gas generation source that generates the gas upon actuation of the igniter, a housing accommodating the igniter and the gas generation source inside the housing, and a plurality of gas discharge ports formed in the housing, the plurality of gas discharge ports being closed by a closing member prior to the actuation of the igniter, and opened when the closing member is ruptured by a pressure of the gas generated by the actuation of the igniter, to allow an inside and an outside of the housing to communicate with each other; in the gas generator, the plurality of gas discharge ports include a plurality of first gas discharge ports and one or a plurality of second gas discharge ports; the second gas discharge ports have a higher opening pressure than the first gas discharge ports; in an arrangement of the plurality of first gas discharge ports in the housing, in an assembled state in which the gas generator is incorporated in the airbag device, a member of the airbag device prevents some first gas discharge ports of the first gas discharge ports from opening by the pressure of the gas, in an arrangement of the one or the plurality of second gas discharge ports in the housing, in the assembled state, the member of the airbag device does not prevent at least some second gas discharge ports of the second gas discharge ports from opening by the pressure of the gas; and an opening pressure of the first gas discharge ports and an opening pressure of the second gas discharge ports are set to cause only the plurality of first gas discharge ports to open by the pressure of the gas among the plurality of gas discharge ports when the igniter is actuated in a stand-alone state prior to the incorporation of the gas generator into the airbag device, and the opening pressure of the first gas discharge ports and the opening pressure of the second gas discharge ports are set to cause the first gas discharge ports excluding the some first gas discharge ports of the first gas discharge ports and the at least some second gas discharge ports of the second gas discharge ports among the plurality of gas discharge ports to open by the pressure of the gas when the igniter is actuated in the assembled state.

In the gas generator described above, a sum of opening areas of the first gas discharge ports opened when the igniter is actuated in the stand-alone state may be equal to a sum of opening areas of the first gas discharge ports and the second gas discharge ports opened when the igniter is actuated in the assembled state.

In the gas generator described above, the number of the some first gas discharge ports of the first gas discharge ports that are prevented by the member of the airbag device from opening in the assembled state may be one or more and ⅔ or less of a total number of the plurality of first gas discharge ports.

In the gas generator described above, the housing may include a peripheral wall portion having a tubular shape, the plurality of gas discharge ports may be formed in the peripheral wall portion, in the assembled state, a part of a region of the peripheral wall portion in a circumferential direction of the peripheral wall portion may be covered by the member of the airbag device, the some first gas discharge ports of the first gas discharge ports may be disposed in the region covered by the member of the airbag device in the assembled state, and the at least some second gas discharge ports of the second gas discharge ports may be disposed in a region uncovered in the assembled state.

In the gas generator described above, the plurality of gas discharge ports may include a plurality of the second gas discharge ports, the plurality of first gas discharge ports may be disposed at equal intervals along the circumferential direction of the peripheral wall portion, and the plurality of second gas discharge ports may be disposed at equal intervals along the circumferential direction of the peripheral wall portion.

In the gas generator described above, an opening area of each of the second gas discharge ports may be ½X, and the number of the second gas discharge ports may be 2Y, where X is an opening area of each of the first gas discharge ports and Y is the number of the first gas discharge ports, and a region of the peripheral wall portion covered by the member of the airbag device may be ½ of an entire circumference of the peripheral wall portion.

In the gas generator described above, an opening area of each of the second gas discharge ports may be ½X, and the number of the second gas discharge ports may be 4Y, where X is an opening area of each of the first gas discharge ports and Y is the number of the first gas discharge ports, and a region of the peripheral wall portion covered by the member of the airbag device may be ⅔ of an entire circumference of the peripheral wall portion.

In the gas generator described above, an opening area of each of the first gas discharge ports may be equal to an opening area of each of the second gas discharge ports, the number of the first gas discharge ports may be equal to the number of the second gas discharge ports, and a region of the peripheral wall portion covered by the member of the airbag device may be ½ of an entire circumference of the peripheral wall portion.

In the gas generator described above, an opening area of each of the second gas discharge ports may be smaller than an opening area of each of the first gas discharge ports.

In the gas generator described above, the closing member may include a first closing member configured to close the first gas discharge ports and a second closing member configured to close the second gas discharge ports, the second closing member being different from the first closing member, and a tensile strength of the second closing member may be greater than a tensile strength of the first closing member.

In the gas generator described above, the plurality of first gas discharge ports are disposed in such an arrangement that a thrust acting on the gas generator is neutralized when the igniter is actuated in the stand-alone state, the thrust being caused by the gas discharged from the plurality of first gas discharge ports.

The technique of the present disclosure may also include an airbag device including the gas generator described above.

The technique of the present disclosure may include a method of operating a gas generator. That is, the technique of the present disclosure may include a method of operating a gas generator, the gas generator being configured to be incorporated in an airbag device and to supply gas to an airbag for inflating the airbag, the gas generator including an igniter, a gas generation source configured to generate the gas upon actuation of the igniter, a housing accommodating the igniter and the gas generation source inside the housing, and a plurality of gas discharge ports formed in the housing, the plurality of gas discharge ports being closed by a closing member prior to the actuation of the igniter, and opened when the closing member is ruptured by a pressure of the gas generated by the actuation of the igniter, to allow an inside and an outside of the housing to communicate with each other, the method including forming the plurality of gas discharge ports in the housing, the plurality of gas discharge ports including a plurality of first gas discharge ports and one or a plurality of second gas discharge ports having a higher opening pressure than the first gas discharge ports, arranging the plurality of first gas discharge ports in the housing such that, in an assembled state in which the gas generator is incorporated in the airbag device, a member of the airbag device prevents some first gas discharge ports of the first gas discharge ports from opening by the pressure of the gas, arranging the one or the plurality of second gas discharge ports in the housing such that, in the assembled state, the member of the airbag device does not prevent at least some second gas discharge ports of the second gas discharge ports from opening by the pressure of the gas, and causing, among the plurality of gas discharge ports, only the plurality of first gas discharge ports to open by the pressure of the gas when the igniter is actuated in a stand-alone state prior to the incorporation of the gas generator into the airbag device, and causing, among the plurality of gas discharge ports, the first gas discharge ports excluding the some first gas discharge ports of the first gas discharge ports and the at least some second gas discharge ports of the second gas discharge ports to open by the pressure of the gas when the igniter is actuated in the assembled state.

Advantageous Effects of Invention

According to the technique of the present disclosure, in a gas generator used in an airbag device, it is possible to reduce a difference in output performance between a stand-alone state of the gas generator and a state where the gas generator is incorporated in the airbag device.

BRIEF DESCRIPTION OF DRAWINGS

FIG. 19 is a table showing calculation results of the sum of opening areas of the gas discharge ports opened in Examples 1 to 9.

DESCRIPTION OF EMBODIMENTS

A gas generator and an airbag device according to an embodiment of the present disclosure will be below described with reference to the drawings. It should be noted that the respective configurations and the combinations thereof in the respective embodiments are merely examples, and additions, omissions, substitutions, and other changes to the configurations can be made as appropriate without departing from the gist of the present invention. The present disclosure is not limited by the embodiment and is limited only by the claims.

Overall Configuration

Figure 1:
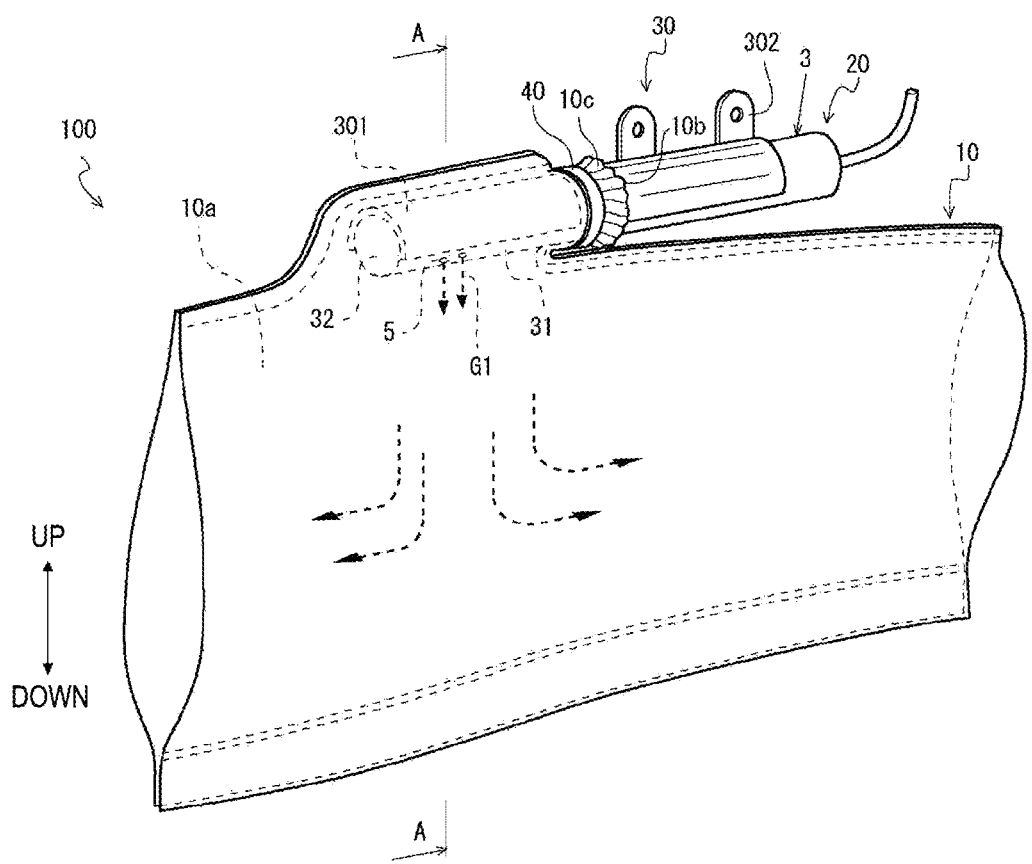
FIG. 1 is an overall view of an airbag device according to an embodiment.
Figure 2:
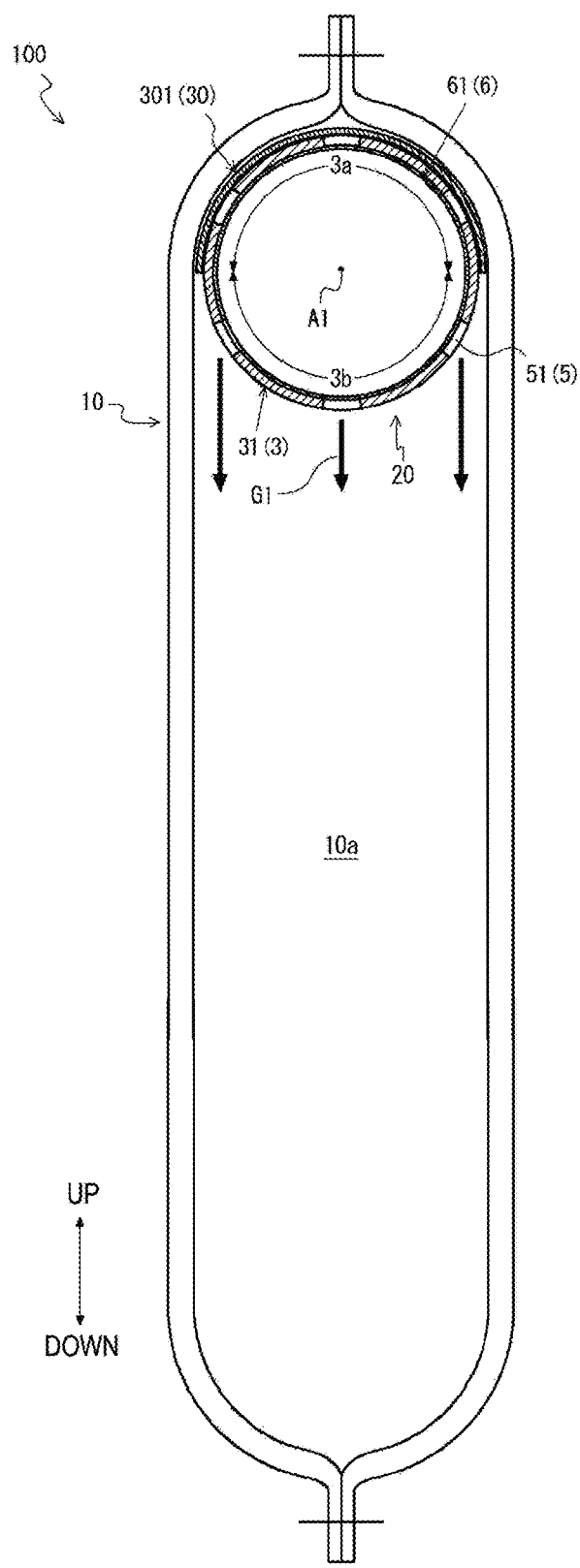
FIG. 2 is a cross-sectional view taken along line A-A of FIG. 1.

FIG. 1 is an overall view of an airbag device 100 according to an embodiment. In FIG. 1, an up-down direction of the airbag device 100 is indicated. FIG. 1 illustrates an airbag, indicated by reference numeral 10, in a state of being inflated and deployed. An arrow indicated by reference numeral G1 in FIG. 1 represents the flow of gas. FIG. 2 is a cross-sectional view taken along line A-A of FIG. 1. The airbag device 100 according to the embodiment is an airbag device for side collision protection (a so-called side airbag device) that is mounted in a vehicle and protects an occupant during a side collision. However, the airbag device according to the present disclosure is not limited to the side airbag device.

As illustrated in FIG. 1, the airbag device 100 includes the airbag 10, a gas generator 20, a mounting member 30, and a clip 40. The airbag device 100 is disposed inside a backrest portion (seat back) of a vehicle seat. The airbag device 100 protects an occupant from impact, by supplying gas from the gas generator 20 to the airbag 10 to inflate and deploy the airbag 10 between the occupant and a side surface structure (a vehicle door for example) of the vehicle when a side collision is detected. Each component of the airbag device 100 will be described below.

Airbag

The airbag 10 is a bag body that inflates when gas is supplied. Reference numeral 10a in FIG. 1 denotes an internal space of the airbag 10. An opening portion 10b for inserting a part of the gas generator 20 and a part of the mounting member 30 into the internal space 10a is formed in an upper portion of the airbag 10.

Gas Generator

Figure 3:
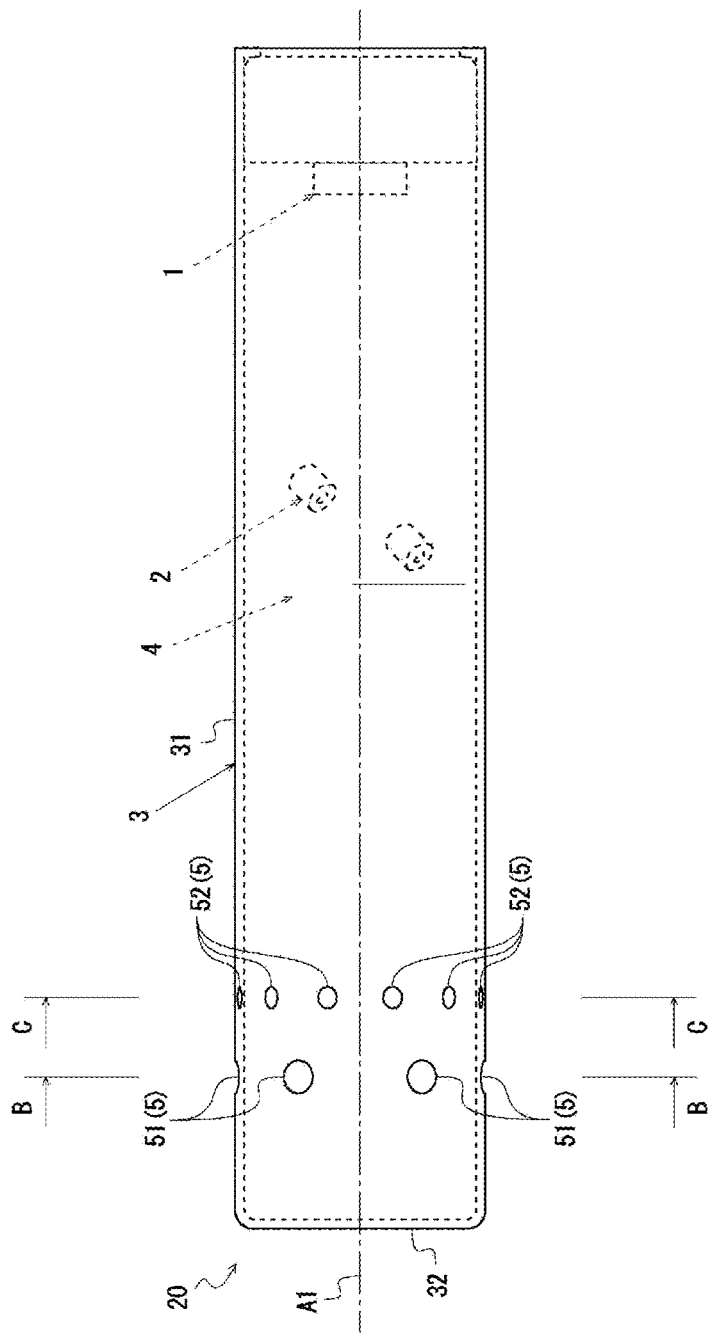
FIG. 3 is a side view of a gas generator.

The gas generator 20 supplies gas to the airbag 10. As illustrated in FIG. 1, the gas generator 20 is generally formed in a tubular shape. FIG. 3 is a side view of the gas generator 20. FIG. 3 illustrates the gas generator 20 in a state prior to incorporation into the airbag device 100 and prior to the actuation of the gas generator 20. In the present specification, as illustrated in FIG. 3, a state in which the gas generator 20 stands alone (being by itself) prior to its incorporation into the airbag device 100 is referred to as a stand-alone state. A state in which the gas generator 20 is incorporated in the airbag device 100, as illustrated in FIGS. 1 and 2, is referred to as an assembled state.

As illustrated in FIG. 3, the gas generator 20 includes an igniter 1, a gas generating agent 2 that generates a combustion gas when the igniter 1 is actuated, a housing 3 that accommodates the igniter 1 and the gas generating agent 2, and a plurality of gas discharge ports 5 formed in the housing 3. In the gas generator 20, the igniter 1 is actuated to burn the gas generating agent 2, and the combustion gas which is the combustion product is discharged (released) from the gas discharge ports 5 formed in the housing 3. Thus, the gas generator 20 supplies the combustion gas to the airbag 10. In the present specification, the actuation of the igniter may be expressed as "actuation of the gas generator" for convenience.

An ignition charge (not illustrated) is accommodated inside the igniter 1. The igniter 1 is actuated by being supplied with an ignition current, burns the ignition charge, and releases a combustion product of the ignition charge such as a flame and a gas at high temperature to the outside of the igniter 1.

The gas generating agent 2 is a solid gas generating agent that is ignited by the combustion product released from the igniter 1 and burns to generate a combustion gas. As the gas generating agent 2, a known gas generating agent including, for example, guanidine nitrate (41 wt. %), basic copper nitrate (49 wt. %), a binder, and an additive can be used. The gas generating agent 2 may have various shapes, such as a granular shape, a pellet shape, a circular columnar shape, and a disk shape. The gas generating agent 2 is an example of a "gas generation source" according to the present disclosure.

The housing 3 is formed in a bottomed tubular shape with a closed end portion. The housing 3 includes a peripheral wall portion 31 having a tubular shape and a lid wall portion 32 that closes an end portion of the peripheral wall portion 31. The igniter 1 and the gas generating agent 2 are accommodated in an internal space (hereinafter referred to as a combustion chamber) 4 of the housing 3 defined by the peripheral wall portion 31 and the lid wall portion 32. Reference numeral A1 in FIG. 3 denotes a center axis of the peripheral wall portion 31. Hereinafter, a direction along the center axis A1 of the peripheral wall portion 31 is referred to as an axial direction of the peripheral wall portion 31 (the housing 3) and the gas generator 20. A direction around the center axis A1 of the peripheral wall portion 31 is referred to as a circumferential direction of the peripheral wall portion 31 (the housing 3) and the gas generator 20.

Figure 4:
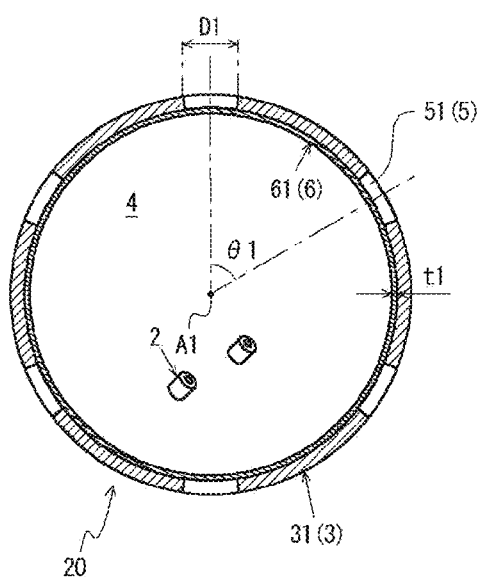
FIG. 4 is a cross-sectional view taken along line B-B of FIG. 3.
Figure 5:
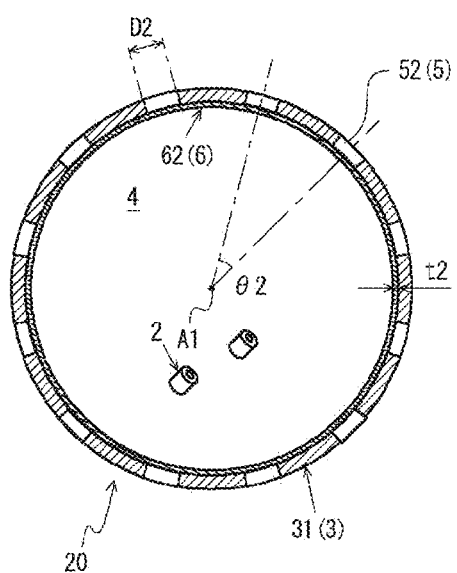
FIG. 5 is a cross-sectional view taken along line C-C of FIG. 3.

As illustrated in FIG. 3, the peripheral wall portion 31 of the housing 3 is formed with the plurality of gas discharge ports 5 that connect the combustion chamber 4, which is the inside of the housing 3, with the outside of the housing 3. The gas generator 20 is not provided with a portion for throttling (choking) the flow of the combustion gas in a gas discharge path from the combustion chamber 4 to the gas discharge ports 5, and the discharge amount of the combustion gas per unit time is adjusted by the gas discharge ports 5. The plurality of gas discharge ports 5 are formed as circular through holes. However, the shape of the gas discharge ports of the present disclosure is not limited to a circular shape. The plurality of gas discharge ports 5 further include a plurality of first gas discharge ports 51 and a plurality of second gas discharge ports 52 having a smaller diameter than the first gas discharge ports 51. The first gas discharge ports 51 and the second gas discharge ports 52 are formed at positions separated from each other in the axial direction. FIG. 4 is a cross-sectional view taken along line B-B of FIG. 3. FIG. 5 is a cross-sectional view taken along line C-C of FIG. 3. FIGS. 4 and 5 illustrate cross sections orthogonal to the axial direction of the gas generator 20. The first gas discharge ports 51 and the second gas discharge ports 52 may be alternately disposed in the circumferential direction, or may be disposed at the same cross section (at the same position in the axial direction of the peripheral wall portion 31).

As illustrated in FIG. 4, the plurality of first gas discharge ports 51 are disposed at equal intervals along the circumferential direction of the peripheral wall portion 31. In the present example, the number of the first gas discharge ports 51 is six. Therefore, an angle θ1 around the center axis A1 between first gas discharge ports 51 that are adjacent to each other in the circumferential direction is 60°. That is, the six first gas discharge ports 51 are disposed in the peripheral wall portion 31 at equal intervals of 60° around the center axis A1.

As illustrated in FIG. 5, the plurality of second gas discharge ports 52 are disposed at equal intervals along the circumferential direction of the peripheral wall portion 31. In the present example, the number of the second gas discharge ports 52 is 12. Therefore, an angle θ2 around the center axis A1 between second gas discharge ports 52 that are adjacent to each other in the circumferential direction is 30°. That is, the 12 second gas discharge ports 52 are disposed in the peripheral wall portion 31 at equal intervals of 30° around the center axis A1.

As illustrated in FIGS. 4 and 5, the plurality of gas discharge ports 5 are closed by sealing tape 6 provided on an inner peripheral surface of the peripheral wall portion 31 in a state prior to the actuation of the igniter 1. The material of the sealing tape 6 is, for example, aluminum. The sealing tape 6 is an example of a "closing member" according to the present disclosure. In the present example, the first gas discharge ports 51 and the second gas discharge ports 52 are closed by separate sealing tapes 6. Hereinafter, the sealing tape 6 that closes each of the first gas discharge ports 51 is referred to as a first sealing tape 61, and the sealing tape 6 that closes each of the second gas discharge ports 52 is referred to as a second sealing tape 62. In the present example, the sealing tape used for the first sealing tape 61 and the sealing tape used for the second sealing tape 62 have the same tensile strength and thickness. However, the first sealing tape 61 and the second sealing tape 62 may have different tensile strength and thickness. Alternatively, the plurality of first gas discharge ports 51 and the plurality of second gas discharge ports 52 may be collectively closed by one sealing tape 6 or a common sealing tape 6.

Each of the gas discharge ports 5 opens when the sealing tape 6 is ruptured by the pressure of the combustion gas generated from the gas generating agent 2 when the igniter 1 is actuated, and serves for connecting the inside (the combustion chamber 4) of the housing 3 with the outside. Accordingly, the combustion gas is discharged from the gas discharge port 5. In the present specification, the pressure required to open the gas discharge port is referred to as an "opening pressure". That is, the opening pressure is a pressure (burst pressure) required to rupture the sealing tape 6. The opening pressure varies depending on the diameter of each of the gas discharge ports 5 (and thus the opening area of each of the gas discharge ports 5), the tensile strength of the sealing tape 6, and the thickness of the sealing tape 6. Here, the thickness of the sealing tape 6 refers to the thickness of the sealing tape 6 in a discharge direction of the gas, that is, a radial direction of the peripheral wall portion 31. An opening pressure P can be expressed by Equation (1) below $$P\,[\text{N/mm}^2] = F\,[\text{N/mm}^2] * 4 * t\,[\text{mm}] / D\,[\text{mm}] \qquad (1)$$

where P is the opening pressure of the gas discharge port 5, D is the diameter of the gas discharge port 5, F is the tensile strength of the sealing tape 6, and t is the thickness of the sealing tape 6.

Here, P1 is the opening pressure of each of the first gas discharge ports 51, D1 is the diameter of the first gas discharge port 51, F1 is the tensile strength of the sealing tape 6 that closes the first gas discharge port 51, and t1 is the thickness of the sealing tape 6 that closes the first gas discharge port 51. Furthermore, P2 is the opening pressure of each of the second gas discharge ports 52, D2 is the diameter of the second gas discharge port 52, F2 is the tensile strength of the second sealing tape 62 that closes the second gas discharge port 52, and t2 is the thickness of the second sealing tape 62 that closes the second gas discharge port 52. As described above, in the present example, the second gas discharge port 52 has a smaller diameter than the first gas discharge port 51, and thus, D1>D2 is satisfied. That is, the opening area of each of the second gas discharge ports 52 is smaller than the opening area of each of the first gas discharge ports 51. In the present example, the first sealing tape 61 and the second sealing tape 62 have the same tensile strength F and the same thickness t, and thus, F1=F2 and t1=t2 are satisfied. Therefrom and from Equation (1) above, P1<P2 is obtained. That is, the opening pressure of the second gas discharge port 52 is higher than the opening pressure of the first gas discharge port 51.

Mounting Member

As illustrated in FIG. 1, the mounting member 30 includes a cover portion 301 and a fixing portion 302. The mounting member 30 is a member for mounting the gas generator 20 in a vehicle, and is an example of a "member of the airbag device" according to the present disclosure.

As illustrated in FIG. 1, the cover portion 301 is formed in the shape of a half cylinder extending along the axial direction of the gas generator 20. The cover portion 301 substantially extends over the entire region of the peripheral wall portion 31 in the axial direction of the peripheral wall portion 31, and covers a part of the peripheral wall portion 31 in the circumferential direction of the peripheral wall portion 31. The fixing portion 302 is a tongue piece protruding from an outer peripheral surface of the cover portion 301.

Assembled State

As illustrated in FIG. 1, in the assembled state, a part of the gas generator 20 is inserted, together with a part of the mounting member 30, into the internal space 10a from the opening portion 10b of the airbag 10. The clip 40 is used to fix the gas generator 20 to the mounting member 30 together with an edge 10c of the opening portion 10b, and thus, the airbag 10 and the gas generator 20 are fixed to the mounting member 30. In the assembled state, all of the gas discharge ports 5 are located in the internal space 10a of the airbag 10, and some gas discharge ports 5 of the gas discharge ports 5 are closed by the cover portion 301, as described later. In the assembled state, the fixing portion 302 of the mounting member 30 is located outside the airbag 10. The fixing portion 302 is utilized to fix the airbag device 100 to a vehicle component (not illustrated).

Figure 6:
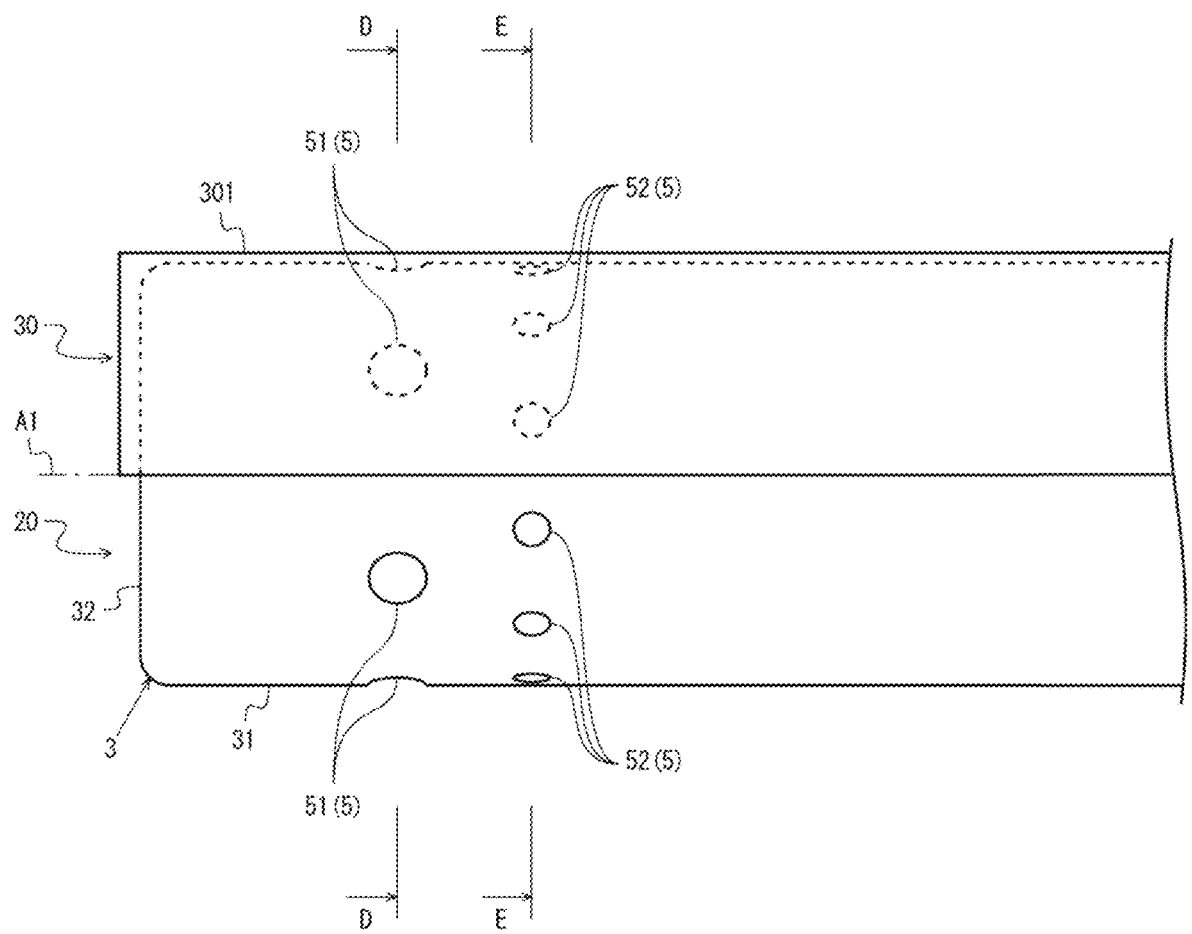
FIG. 6 is a side view for describing a positional relationship between the gas generator and a cover portion in an assembled state.
Figure 7:
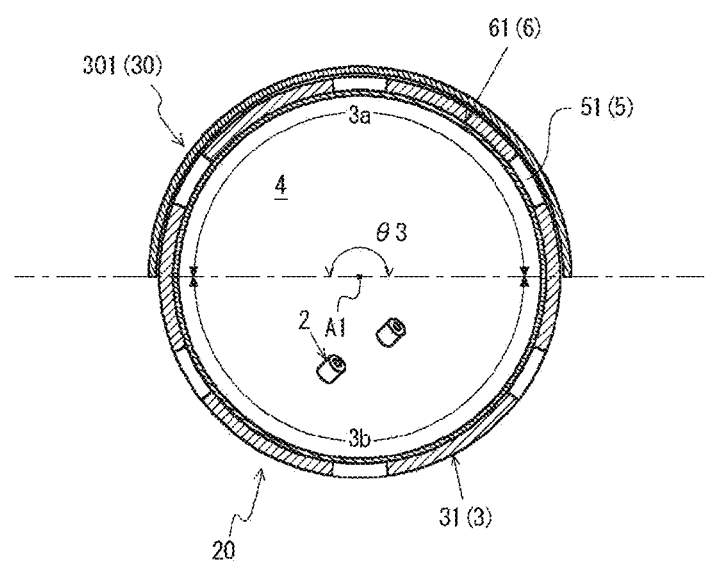
FIG. 7 is a cross-sectional view taken along line D-D of FIG. 6.
Figure 8:
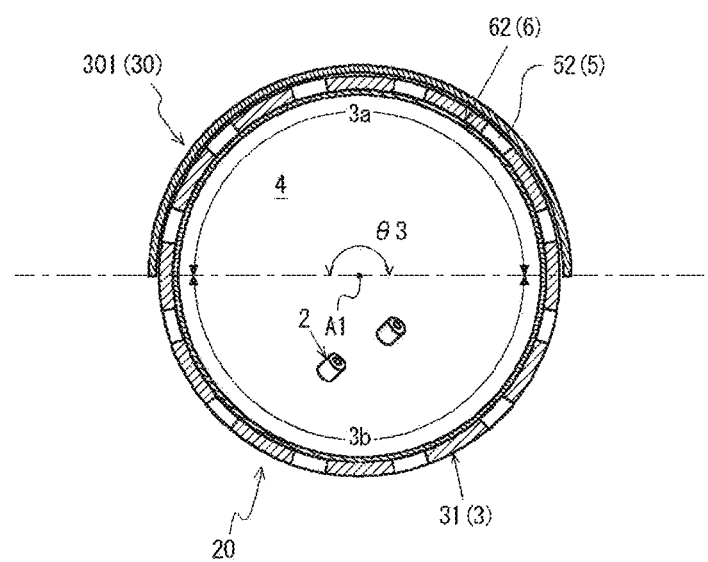
FIG. 8 is a cross-sectional view taken along line E-E of FIG. 6.

FIG. 6 is a side view for describing a positional relationship between the gas generator 20 and the cover portion 301 in the assembled state. FIG. 6 illustrates the assembled state and illustrates a state prior to the actuation of the gas generator 20. FIG. 7 is a cross-sectional view taken along line D-D of FIG. 6. FIG. 8 is a cross-sectional view taken along line E-E of FIG. 6. FIGS. 7 and 8 illustrate cross sections orthogonal to the axial direction of the gas generator 20. As illustrated in FIGS. 7 and 8, a region of the peripheral wall portion 31 covered by the cover portion 301 in the assembled state is referred to as a first region 3a, and a region of the peripheral wall portion 31 that is exposed and not covered by the cover portion 301 in the assembled state, that is, a region of the peripheral wall portion 31 excluding the first region 3a, is referred to as a second region 3b. The angular range of the first region 3a in the circumferential direction of the peripheral wall portion 31 is θ3. In the present example, θ3 is 180°. That is, the cover portion 301 according to the present example covers half of the peripheral wall portion 31 in the circumferential direction of the peripheral wall portion 31. However, the size of θ3 is not limited to the value mentioned above. θ3 can be set within a predetermined range, as long as the cover portion 301 can cover some gas discharge ports of the gas discharge ports.

As described above, the plurality of first gas discharge ports 51 are disposed at equal intervals along the circumferential direction of the peripheral wall portion 31. Therefore, as illustrated in FIG. 7, in the assembled state, half of the peripheral wall portion 31 in the circumferential direction of the peripheral wall portion 31 is covered by the cover portion 301. Therefore, some first gas discharge ports 51 of the first gas discharge ports 51 are covered by the cover portion 301 and the remaining ones of the first gas discharge ports 51 are exposed and not covered by the cover portion 301. That is, among the plurality of first gas discharge ports 51, some first gas discharge ports 51 of the first gas discharge ports 51 are disposed in the first region 3a and covered by the cover portion 301, and the remaining ones of the first gas discharge ports 51 are disposed in the second region 3b and exposed. More specifically, one half (three) of the plurality of first gas discharge ports 51 are disposed in the first region 3a and another half (three) are disposed in the second region 3b.

Similarly, the plurality of second gas discharge ports 52 are also disposed at equal intervals along the circumferential direction of the peripheral wall portion 31. Therefore, as illustrated in FIG. 8, in the assembled state, half of the peripheral wall portion 31 in the circumferential direction of the peripheral wall portion 31 is covered by the cover portion 301. Accordingly, among the plurality of second gas discharge ports 52, some second gas discharge ports 52 of the second gas discharge ports 52 are disposed in the second region 3b and are exposed, and the remaining ones of the second gas discharge ports 52 are disposed in the first region 3a and are closed by the cover portion 301. That is, half (six) of the plurality of second gas discharge ports 52 are disposed in the first region 3a and the other half (six) are disposed in the second region 3b.

The first region 3a is covered by the cover portion 301 from the outside, and thus, the cover portion 301 prevents (hinders) the first gas discharge ports 51 and the second gas discharge ports 52 disposed in the first region 3a from opening by the pressure of the combustion gas. On the other hand, the cover portion 301 does not prevent (hinder) the first gas discharge ports 51 and the second gas discharge ports 52 disposed in the second region 3b that is not covered by the cover portion 301 from opening by the pressure of the combustion gas.

As illustrated in FIGS. 1 and 2, in the assembled state, the gas generator 20 and the mounting member 30 are disposed at an upper end portion (upper corner) of the internal space 10a. As illustrated in FIG. 2, the first region 3a faces upward, and the second region 3b faces downward.

Operation of Gas Generator

Figure 9:
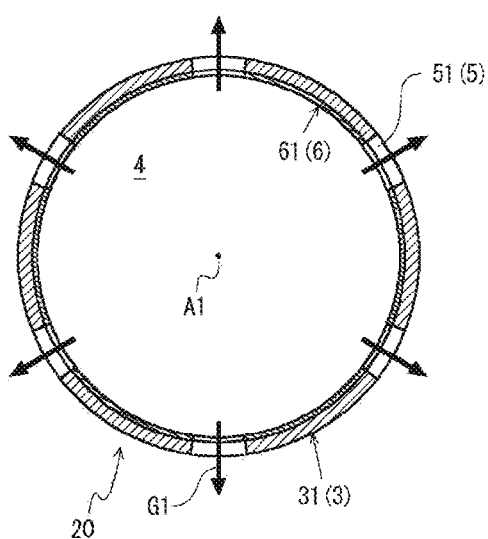
FIG. 9 is a cross-sectional view for describing a state of first gas discharge ports when an igniter is actuated in a stand-alone state.
Figure 10:
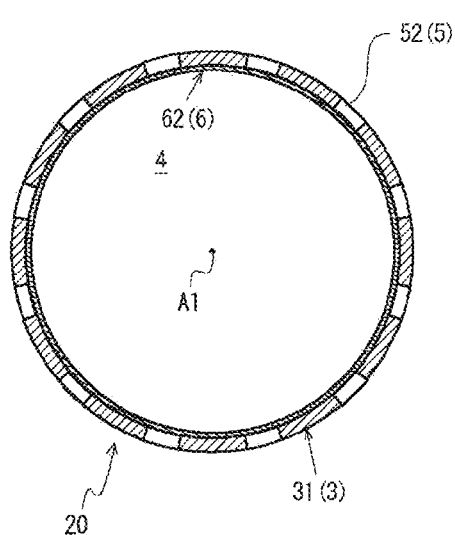
FIG. 10 is a cross-sectional view for describing a state of second gas discharge ports when the igniter is actuated in the stand-alone state.
Figure 11:
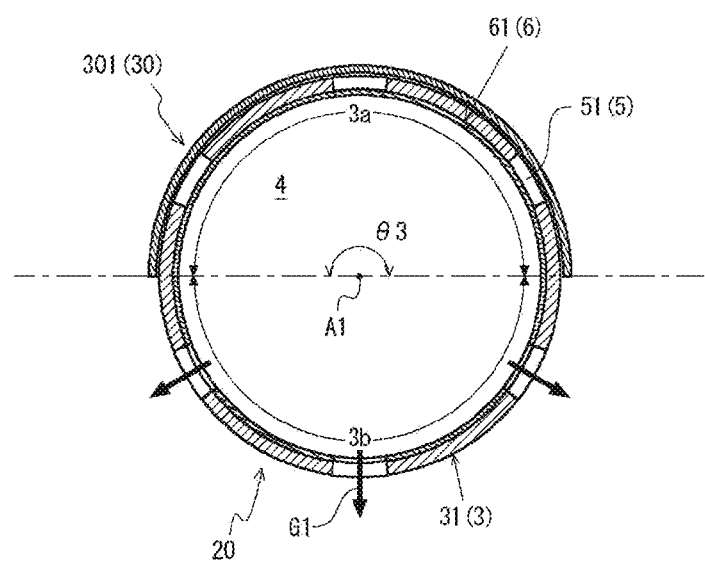
FIG. 11 is a cross-sectional view for describing a state of the first gas discharge ports when the igniter is actuated in the assembled state.
Figure 12:
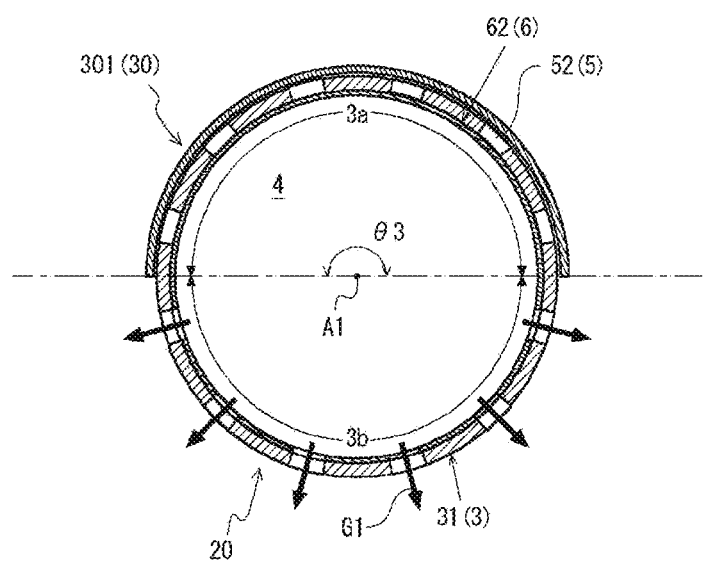
FIG. 12 is a cross-sectional view for describing a state of the second gas discharge ports when the igniter is actuated in the assembled state.

A basic operation of the gas generator 20 according to the embodiment will be described below. FIG. 9 is a cross-sectional view for describing a state of the first gas discharge ports 51 when the igniter 1 is actuated in the stand-alone state. FIG. 10 is a cross-sectional view for describing a state of the second gas discharge ports 52 when the igniter 1 is actuated in the stand-alone state. FIG. 11 is a cross-sectional view for describing a state of the first gas discharge ports 51 when the igniter 1 is actuated in the assembled state. FIG. 12 is a cross-sectional view for describing a state of the second gas discharge ports 52 when the igniter 1 is actuated in the assembled state. FIGS. 9 to 12 illustrate cross sections orthogonal to the axial direction of the gas generator 20.

First, with reference to FIGS. 9 and 10, a case will be described in which the igniter 1 is actuated in the stand-alone state. When the igniter 1 is actuated, the ignition charge accommodated in the igniter 1 is burned, and a combustion product of the ignition charge such as a flame and a gas at high temperature, are released into the combustion chamber 4. The combustion of the gas generating agent 2 accommodated in the combustion chamber 4 generates a combustion gas having high temperature and high pressure. When the combustion gas is generated, the internal pressure of the combustion chamber 4 increases, and the pressure of the gas acts on each of the gas discharge ports 5. Here, the opening pressure of the first gas discharge ports 51 is set such that the pressure of the combustion gas opens the first gas discharge ports 51 when the igniter 1 is actuated in the stand-alone state. That is, the opening pressure of the first gas discharge ports 51 is equal to or lower than the internal pressure of the combustion chamber 4 in the case where the igniter 1 is actuated in the stand-alone state. Therefore, as illustrated in FIG. 9, when the igniter 1 is actuated in the stand-alone state, all of the plurality of first gas discharge ports 51 are opened. Thus, in the stand-alone state, the combustion gas is discharged from all of the first gas discharge ports 51. Furthermore, the opening pressure of the second gas discharge ports 52 is set such that the pressure of the combustion gas does not open the second gas discharge ports 52 when the igniter 1 is actuated in the stand-alone state. That is, the opening pressure of the second gas discharge ports 52 is higher than the pressure of the combustion gas when the igniter 1 is actuated in the stand-alone state. Therefore, as illustrated in FIG. 10, when the igniter 1 is actuated in the stand-alone state, none of the plurality of second gas discharge ports 52 are opened, and all of the second gas discharge ports 52 remain closed. Thus, in the stand-alone state, the combustion gas is not discharged from any of the second gas discharge ports 52.

The plurality of first gas discharge ports 51 are disposed at equal intervals along the circumferential direction of the peripheral wall portion 31. Therefore, when all of the first gas discharge ports 51 are opened and the combustion gas is discharged therefrom, discharge directions from the first gas discharge ports 51 are opposite to each other. Therefore, the reaction forces from the discharge of the combustion gas from the first gas discharge ports 51 neutralize each other. As a result, when the igniter 1 is actuated in the stand-alone state, the thrust acting on the gas generator 20 by the gas discharged from the first gas discharge ports 51 is neutralized. Accordingly, the gas generator 20 can be prevented from flying by the thrust from the discharge of the gas in a case of a fire or an accidental ignition in an event such as a malfunction of the igniter 1 in the stand-alone state.

Next, a case in which the igniter 1 is actuated in the assembled state will be described with reference to FIGS. 11 and 12. For example, when the gas generator 20 is in the assembled state, and a sensor (not illustrated) of a vehicle senses an impact, an ignition current is supplied to the igniter 1 and the igniter 1 is actuated. When the igniter 1 is actuated, the gas generating agent 2 is burned to generate the combustion gas, and thus, the internal pressure of the combustion chamber 4 increases. However, the first gas discharge ports 51 disposed in the first region 3a are not opened in the assembled state because the cover portion 301 prevents the first gas discharge ports 51 from opening by the pressure of the combustion gas. Therefore, when the igniter 1 is actuated in the assembled state, first, as illustrated in FIG. 11, among the plurality of first gas discharge ports 51, only the first gas discharge ports 51 disposed in the second region 3b are opened, and the combustion gas is discharged.

Here, the first gas discharge ports 51 disposed in the first region 3a are not opened in the assembled state, and thus, a sum of the opening areas of the first gas discharge ports 51 opened when the igniter 1 is actuated in the assembled state is smaller than a sum of the opening areas of the first gas discharge ports 51 opened when the igniter 1 is actuated in the stand-alone state. Therefore, immediately after the igniter 1 is actuated in the assembled state, that is, at the time when only the first gas discharge ports 51 in the second region 3b are opened and the second gas discharge ports 52 are not yet opened, the combustion gas is not as easily discharged from the gas generator 20 as in the state of FIG. 9. Accordingly, the internal pressure of the combustion chamber 4 immediately after the igniter 1 is actuated in the assembled state is higher than the internal pressure of the combustion chamber 4 when the igniter 1 is actuated in the stand-alone state (that is, the state illustrated in FIG. 9). Here, in the present embodiment, the opening pressure of the second gas discharge ports 52 is set such that the second gas discharge ports 52 rupture in a case where the internal pressure of the combustion chamber 4 is higher than the internal pressure when the igniter 1 is actuated in the stand-alone state and lower than the internal pressure presumably reached when only the first gas discharge ports 51 in the second region 3b are opened when the igniter 1 is actuated in the assembled state. On the other hand, the second gas discharge ports 52 disposed in the first region 3a are not opened in the assembled state because the cover portion 301 prevents the second gas discharge ports 52 disposed in the first region 3a from opening by the pressure of the combustion gas. Accordingly, when the igniter 1 is actuated in the assembled state, after the first gas discharge ports 51 disposed in the second region 3b are opened, among the plurality of second gas discharge ports 52, only the second gas discharge ports 52 disposed in the second region 3b are opened and the combustion gas is discharged, as illustrated in FIG. 12.

As described above, when the igniter 1 is actuated in the assembled state, among the plurality of gas discharge ports 5, only the gas discharge ports 5 (the first gas discharge ports 51 and the second gas discharge ports 52) disposed in the second region 3b are opened, and the combustion gas is discharged. Thus, in the assembled state, the combustion gas discharged from the gas generator 20 is deflected in a direction in which the second region 3b faces. As illustrated in FIG. 2, in the assembled state, the gas generator 20 is disposed at an upper end portion (upper corner) in the internal space 10a of the airbag 10, and the second region 3b faces downward. Therefore, when the gas generator 20 is actuated, the combustion gas is discharged downward from the second region 3b, and the airbag 10 can quickly inflate.

Actions and Effects

As described above, the gas generator 20 according to the embodiment includes the igniter 1, the gas generating agent 2 that generates the combustion gas when the igniter 1 is actuated, the housing 3 that accommodates the igniter 1 and the gas generating agent 2 therein, and the plurality of gas discharge ports 5 formed in the housing 3. The plurality of gas discharge ports 5 are closed by the sealing tape 6 prior to the actuation of the igniter 1, and are opened when the sealing tape 6 is ruptured by the pressure of the combustion gas generated from the gas generating agent 2 when the igniter 1 is actuated, and then, the inside and the outside of the housing 3 are connected with each other. The plurality of gas discharge ports 5 include the plurality of first gas discharge ports 51 and the plurality of second gas discharge ports 52 having a higher opening pressure than the first gas discharge ports 51. The plurality of first gas discharge ports 51 are disposed in the housing 3 and in the assembled state of the gas generator 20, the mounting member 30 prevents some first gas discharge ports 51 of the first gas discharge ports 51 from opening by the pressure of the combustion gas. Furthermore, the plurality of second gas discharge ports 52 are disposed in the housing 3 and in the assembled state, and thus the mounting member 30 does not prevent some second gas discharge ports 52 of the second gas discharge ports 52 from opening by the pressure of the combustion gas (that is, the some second gas discharge ports 52 of the second gas discharge ports 52 can be opened by the pressure of the combustion gas). The opening pressures of the first gas discharge ports 51 and the second gas discharge ports 52 are set such that, when the igniter 1 is actuated in the stand-alone state of the gas generator 20, only, but all of, the plurality of first gas discharge ports 51 are opened by the pressure of the combustion gas. Moreover, the opening pressures of the first gas discharge ports 51 and the second gas discharge ports 52 are set such that, when the igniter 1 is actuated in the assembled state, among the plurality of gas discharge ports 5, the first gas discharge ports 51 excluding the some first gas discharge ports 51 of the first gas discharge ports 51 mentioned above, and the some second gas discharge ports 52 of the second gas discharge ports 52 mentioned above, are opened by the pressure of the combustion gas.

According to the gas generator 20 having such a configuration, in the stand-alone state, all of the plurality of first gas discharge ports 51 are opened, and in the assembled state, among the plurality of first gas discharge ports 51, only the first gas discharge ports 51 other than the some first gas discharge ports 51 of the first gas discharge ports 51 mentioned above are opened. Thus, the discharge directions of the combustion gas from the gas generator 20 are different for the stand-alone state and the assembled state. For example, as in the present example, in the stand-alone state, the combustion gas is radially discharged, and thus, the thrust acting on the gas generator 20 is neutralized. In the assembled state, the combustion gas discharged is deflected toward a specific direction, and thus, the airbag 10 can be rapidly inflated. On the other hand, in the assembled state, the number of the first gas discharge ports 51 that open is smaller than the number of the first gas discharge ports 51 opened in the stand-alone state, and thus, the sum of the opening areas of the first gas discharge ports 51 that open is also reduced compared with the stand-alone state. On the other hand, in the gas generator 20 according to the embodiment, none of the second gas discharge ports 52 are opened in the stand-alone state and some second gas discharge ports 52 of the second gas discharge ports 52 are opened in the assembled state. Thus, this configuration reduces the difference between the sum of the opening areas of the gas discharge ports 5 opened in the stand-alone state and the sum of the opening areas of the gas discharge ports 5 opened in the assembled state. In general, the output performance of a gas generator corresponds to the sum of the opening areas of the gas discharge ports opened when the igniter is actuated. According to the gas generator 20 of the embodiment, by reducing the difference between the sum of the opening areas of the gas discharge ports 5 opened in the stand-alone state and the sum of the opening areas of the gas discharge ports 5 opened in the assembled state, it is possible to reduce the difference in the output performance between the stand-alone state and the assembled state. The output performance of a gas generator is designed under consideration of stand-alone state operation of the gas generator. With reduction in the difference in the output performance between the stand-alone state and the assembled state, the gas generator 20 can achieve an output performance close to the design value, even in the assembled state.

Note that the total number of the gas discharge ports 5, the number of the first gas discharge ports 51, the number of the second gas discharge ports 52, the number of the first gas discharge ports 51 and the second gas discharge ports 52 covered by the cover portion 301 in the assembled state, the arrangement of the first gas discharge ports 51 and the second gas discharge ports 52, and the opening area of each of the first gas discharge ports 51 and each of the second gas discharge ports 52 are not limited to the above-described aspects.

Further, in the gas generator 20 according to the embodiment, the opening area of each of the second gas discharge ports 52 is smaller than the opening area of each of the first gas discharge ports 51, and thus, the opening pressure (rupture pressure) of the second gas discharge ports 52 is higher than the opening pressure of the first gas discharge ports 51. Alternatively, the diameter (opening area) of each of the second gas discharge ports 52 may be equal to the diameter (opening area) of each of the first gas discharge ports 51, and the tensile strength F2 of the second sealing tape 62 may be greater than the tensile strength F1 of the first sealing tape 61. Alternatively, the diameter of each of the second gas discharge ports 52 may be equal to the diameter of each of the first gas discharge ports 51, and the thickness t2 of the second sealing tape 62 may be greater than the thickness t1 of the first sealing tape 61. Furthermore, by adjusting both the diameter (opening area) of the gas discharge ports 5 and the characteristics (such as the tensile strength and the thickness) of the sealing tape 6, the opening pressure of each of the gas discharge ports 5 can be adjusted. With any configuration above, the opening pressure of the second gas discharge ports 52 can be higher than the opening pressure of the first gas discharge ports 51. In the adjustment of the thickness t of the sealing tape 6, a plurality of sealing tapes may be stacked to form one sealing tape 6, and the thickness t may be adjusted by changing the number of stacked sealing tapes.

In the configuration of the gas generator 20 according to the embodiment, a part of the region in the circumferential direction of the peripheral wall portion 31 of the housing 3 is covered by the cover portion 301 of the mounting member 30 in the assembled state. Some first gas discharge ports 51 of the first gas discharge ports 51 are disposed in the first region 3a covered by the cover portion 301 in the assembled state, and some second gas discharge ports of the second gas discharge ports 52 are disposed in the second region 3b that is exposed in the assembled state. Thus, in the assembled state, some first gas discharge ports 51 of the first gas discharge ports 51 are prevented from opening by the pressure of the combustion gas, and some second gas discharge ports 52 of the second gas discharge ports 52 are not prevented from opening by the pressure of the combustion gas.

In the gas generator 20 according to the present embodiment, the plurality of first gas discharge ports 51 are disposed at equal intervals along the circumferential direction of the peripheral wall portion 31. Thus, this configuration can neutralize the thrust acting on the gas generator 20 by the combustion gas discharged from the plurality of first gas discharge ports 51 when the igniter 1 is actuated in the stand-alone state. Accordingly, the gas generator 20 can be prevented from flying by the thrust from the discharge of the combustion gas in a case of a fire or an accidental ignition in an event such as a malfunction of the igniter 1 in the stand-alone state.

Figure 13:
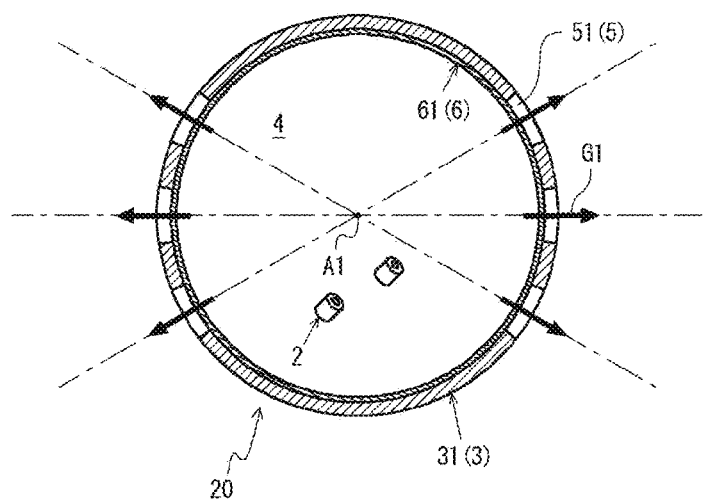
FIG. 13 is a cross-sectional view for describing an arrangement of the first gas discharge ports according to a first modification.

An arrangement of the first gas discharge ports 51 which can make the gas generator 20 thrust neutral when the igniter 1 is actuated in the stand-alone state is not limited to the arrangement illustrated in FIG. 4 and the like, and not all of the first gas discharge ports 51 may be disposed at equal intervals along the circumferential direction. FIG. 13 is a cross-sectional view for describing an arrangement of the first gas discharge ports 51 according to a first modification. FIG. 13 illustrates the gas generator 20 prior to the actuation in the stand-alone state, and illustrates a cross section orthogonal to the axial direction of the gas generator 20. In the first modification illustrated in FIG. 13, in the arrangement of the plurality of first gas discharge ports 51, the center axis A1 is set as a point of symmetry viewed in the axial direction of the peripheral wall portion 31, and each one of the first gas discharge ports 51 is disposed at a position point-symmetrical to another one of the first gas discharge ports 51. With such an arrangement of the first gas discharge ports 51, the gas generator 20 can be made thrust neutral when the igniter 1 is actuated in the stand-alone state.

Figure 14:
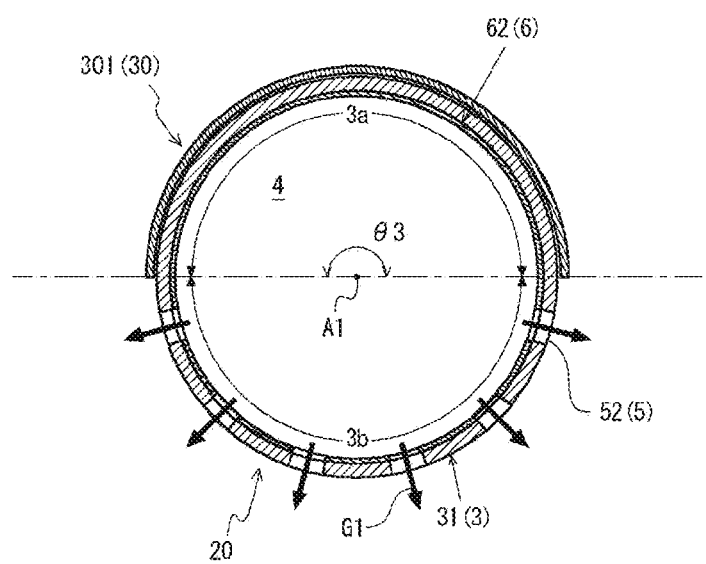
FIG. 14 is a cross-sectional view for describing an arrangement of the second gas discharge ports according to a second modification.
Figure 15:
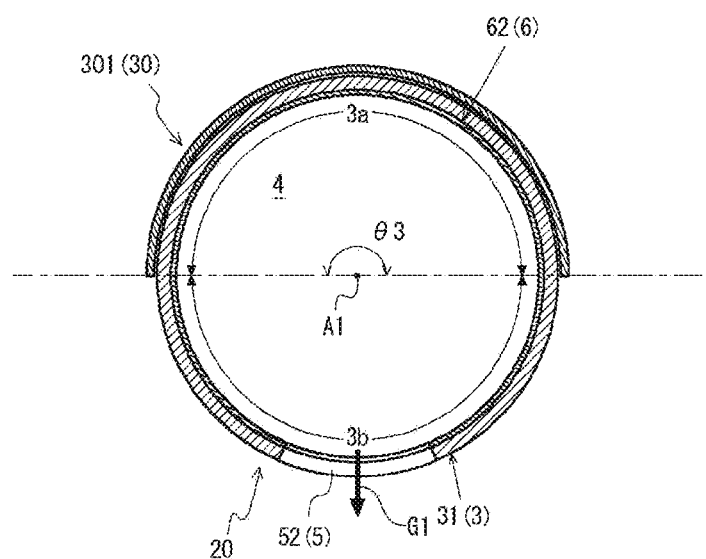
FIG. 15 is a cross-sectional view for describing an arrangement of the second gas discharge ports according to a third modification.

FIG. 14 is a cross-sectional view for describing an arrangement of the second gas discharge ports 52 according to a second modification. FIG. 15 is a cross-sectional view for describing an arrangement of the second gas discharge ports 52 according to a third modification. FIGS. 14 and 15 illustrate the gas generator 20 prior to the actuation in the assembled state, and illustrate cross sections orthogonal to the axial direction of the gas generator 20. In the second modification illustrated in FIG. 14, the second gas discharge ports 52 are not disposed in the first region 3a, and a plurality of the second gas discharge ports 52 are disposed in the second region 3b. In the third modification illustrated in FIG. 15, the second gas discharge ports 52 are not disposed in the first region 3a, and only one second gas discharge port 52 is disposed in the second region 3b. As illustrated in FIGS. 14 and 15, at least one second gas discharge port 52 may be disposed in the second region 3b of the peripheral wall portion 31, and all of the second gas discharge ports 52 may be disposed in the second region 3b. That is, at least one second gas discharge port 52 that is not prevented from opening by the pressure of the combustion gas in the assembled state may be present, and there may be no second gas discharge port 52 that is prevented by the mounting member 30 from opening. In the technique according to the present disclosure, the plurality of gas discharge ports may include one or a plurality of second gas discharge ports, and the one or the plurality of second gas discharge ports may be disposed in the housing such that at least some second gas discharge ports of the second gas discharge ports among the one or the plurality of second gas discharge ports are not prevented by a member of the airbag device from opening by the pressure of the combustion gas.

Figure 16:
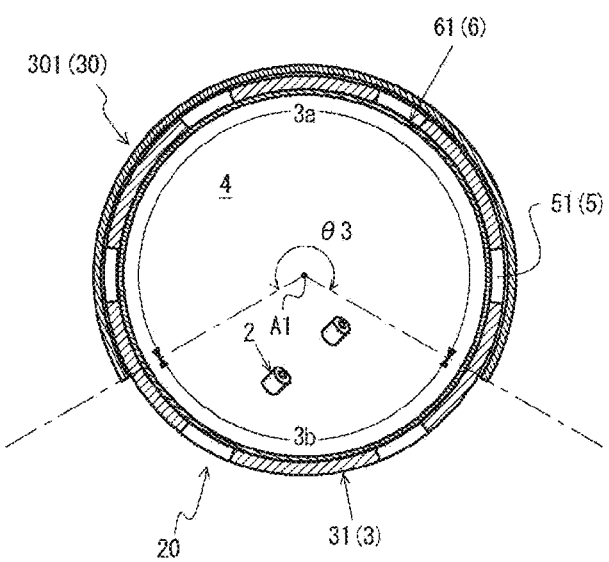
FIG. 16 is a cross-sectional view for describing an arrangement of the first gas discharge ports according to a fourth modification.
Figure 17:
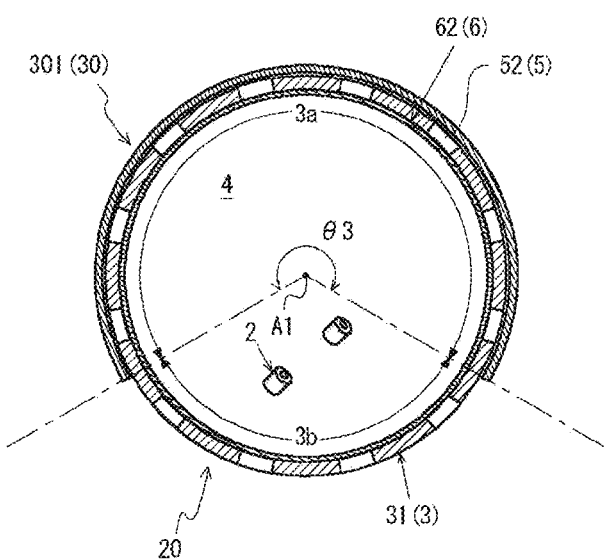
FIG. 17 is a cross-sectional view for describing an arrangement of the second gas discharge ports according to the fourth modification.

FIG. 16 is a cross-sectional view for describing an arrangement of the first gas discharge ports 51 according to a fourth modification. FIG. 17 is a cross-sectional view for describing an arrangement of the second gas discharge ports 52 according to the fourth modification. FIGS. 16 and 17 illustrate the gas generator 20 prior to the actuation in the assembled state, and illustrate cross sections orthogonal to the axial direction of the gas generator 20. In the fourth modification illustrated in FIGS. 16 and 17, the angular range θ3 of the first region 3a in the circumferential direction of the peripheral wall portion 31 is θ3=240°. That is, the cover portion 301 according to the fourth modification covers ⅔ of the peripheral wall portion 31 in the circumferential direction of the peripheral wall portion 31. Accordingly, ⅔ of the total number of the first gas discharge ports 51 and ⅔ of the total number of the second gas discharge ports 52 are covered by the cover portion 301. As illustrated in FIG. 16, in the fourth modification, four of the first gas discharge ports 51 among the six first gas discharge ports 51 are disposed in the first region 3a, and two of the first gas discharge ports 51 are disposed in the second region 3b. As illustrated in FIG. 17, eight of the second gas discharge ports 52 among the 12 second gas discharge ports 52 are disposed in the first region 3a, and four of the second gas discharge ports 52 are disposed in the second region 3b.

Note that the shape of the housing according to the present disclosure and the positions at which the gas discharge ports are formed are not limited to the above-described aspects. The housing may not have a tubular shape, and the gas discharge ports may not be formed in the peripheral wall portion.

Method of Operating Gas Generator

Figure 18:
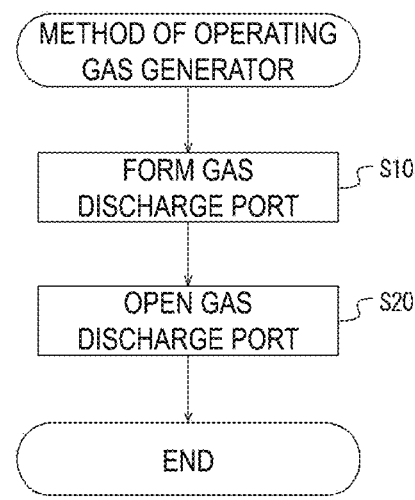
FIG. 18 illustrates a procedure in a method of operating the gas generator.

FIG. 18 illustrates a procedure in a method of operating the gas generator 20. As illustrated in FIG. 18, a method of operating a gas generator according to the embodiment includes a step of forming a gas discharge port (step S10) and a step of opening the gas discharge port (step S20).

First, in step S10, a plurality of the first gas discharge ports 51 and one or a plurality of the second gas discharge ports 52 having a higher opening pressure than the opening pressure of the first gas discharge ports 51 are formed in the housing 3. In step S10, the plurality of first gas discharge ports 51 are disposed in the housing 3 in such an arrangement that the mounting member 30 prevents some first gas discharge ports 51 of the first gas discharge ports 51 from opening by the pressure of the combustion gas in the assembled state. In step S10, one or a plurality of the second gas discharge ports 52 are disposed in the housing 3 in such an arrangement that at least some second gas discharge ports of the second gas discharge ports 52 are not prevented from opening by the pressure of the combustion gas in the assembled state.

Next, in step S20, when the igniter 1 is actuated in the stand-alone state of the gas generator 20, only, but all of, the plurality of first gas discharge ports 51 are opened by the pressure of the combustion gas. Furthermore, in step S20, when the igniter 1 is actuated in the assembled state of the gas generator 20, among the plurality of gas discharge ports 5, the first gas discharge ports 51 excluding the above-mentioned some first gas discharge ports 51 of the first gas discharge ports 51, and the above-mentioned at least some second gas discharge ports 52 of the second gas discharge ports 52 are opened by the pressure of the combustion gas.

When the gas generator 20 is operated as described above, the method can reduce the difference between the sum of the opening areas of the gas discharge ports 5 opened in the stand-alone state and the sum of the opening areas of the gas discharge ports 5 opened in the assembled state, and can reduce the difference in output performance between the stand-alone state and the assembled state.

Examples

Figure 19:
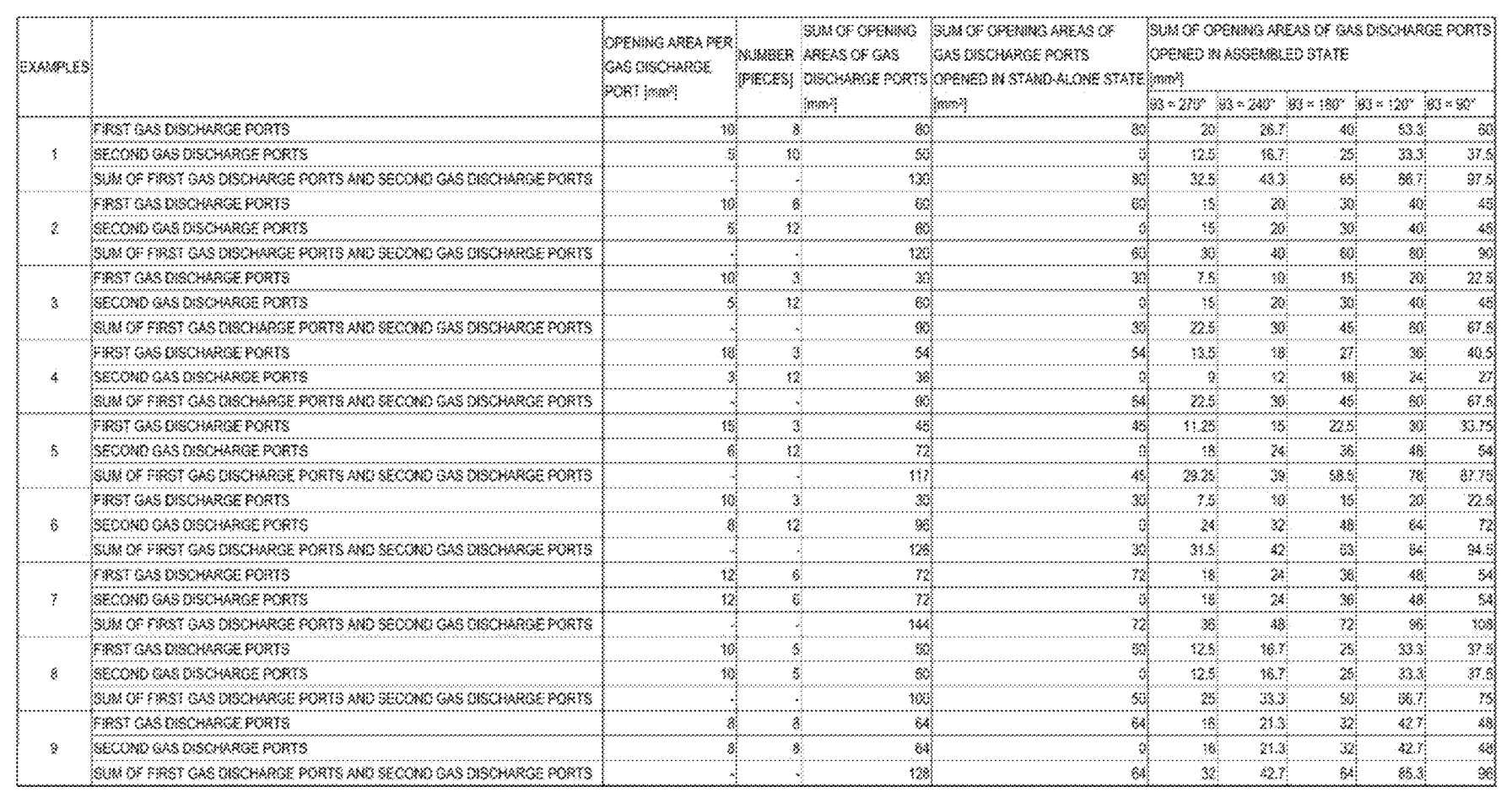

Examples of the airbag device 100 according to the embodiment will be described below. FIG. 19 is a table showing calculation results of the sum of the opening areas of the gas discharge ports 5 opened in Examples 1 to 9. In Examples 1 to 9, the plurality of first gas discharge ports 51 are disposed at equal intervals along the circumferential direction of the peripheral wall portion 31, and the plurality of second gas discharge ports 52 are disposed at equal intervals along the circumferential direction of the peripheral wall portion 31.

In FIG. 19, numerical values listed in the column "opening area per gas discharge port [mm²]" represent an opening area of each of the first gas discharge ports 51 and an opening area of each of the second gas discharge ports 52. In FIG. 19, numerical values listed in the column "number [pieces]" represent the number of the first gas discharge ports 51 and the number of the second gas discharge ports 52. In FIG. 19, numerical values listed in the column "sum of opening areas of gas discharge ports [mm²]" represent the sum of the opening areas of all of the first gas discharge ports 51, the sum of the opening areas of all of the second gas discharge ports 52, and the sum of the opening areas of all of the first gas discharge ports 51 and all of the second gas discharge ports 52 (that is, the sum of the opening areas of all of the gas discharge ports 5). In FIG. 19, the numerical values listed in the column "sum of opening areas of gas discharge ports opened in stand-alone state [mm²]" represent the sum of the opening areas of the first gas discharge ports 51 opened when the igniter 1 is actuated in the stand-alone state, the sum of the opening areas of the second gas discharge ports 52 opened when the igniter 1 is actuated in the stand-alone state, and the sum of the opening areas of the first gas discharge ports 51 and the second gas discharge ports 52 opened when the igniter 1 is actuated in the stand-alone state. In FIG. 19, the numerical values listed in the column "sum of opening areas of gas discharge ports opened in assembled state [mm²]" represent the sum of the opening areas of the first gas discharge ports 51 opened when the igniter 1 is actuated in the assembled state, the sum of the opening areas of the second gas discharge ports 52 opened when the igniter 1 is actuated in the assembled state, and the sum of the opening areas of the first gas discharge ports 51 and the second gas discharge ports 52 opened when the igniter 1 is actuated in the assembled state.

For Examples 1 to 3, the numbers of the first gas discharge ports 51 and the second gas discharge ports 52 are different, but the opening areas of each of the first gas discharge ports 51 and each of the second gas discharge ports 52 are the same. In Example 1, the opening area of each of the first gas discharge ports 51 is 10 [mm²], the opening area of each of the second gas discharge ports 52 is 5 [mm²], the number of the first gas discharge ports 51 is 8 [pieces], and the number of the second gas discharge ports 52 is 10 [pieces]. In Example 2, the opening area of each of the first gas discharge ports 51 is 10 [mm²], the opening area of each of the second gas discharge ports 52 is 5 [mm²], the number of the first gas discharge ports 51 is 6 [pieces], and the number of the second gas discharge ports 52 is 12 [pieces]. In Example 3, the opening area of each of the first gas discharge ports 51 is 10 [mm²], the opening area of each of the second gas discharge ports 52 is 5 [mm²], the number of the first gas discharge ports 51 is 3 [pieces], and the number of the second gas discharge ports 52 is 12 [pieces]. In Examples 1 to 3, the burst pressure of the first gas discharge ports 51 and the burst pressure of the second gas discharge ports 52 are adjusted by the difference in the opening areas of the discharge ports.

For Examples 4 to 6, the number of the first gas discharge ports 51 and the number of the second gas discharge ports 52 are the same, but the opening area of the first gas discharge ports 51 and the opening area of the second gas discharge ports 52 are different. In Example 4, the opening area of each of the first gas discharge ports 51 is 18 [mm²], the opening area of each of the second gas discharge ports 52 is 3 [mm²], the number of the first gas discharge ports 51 is 3 [pieces], and the number of the second gas discharge ports 52 is 12 [pieces]. In Example 5, the opening area of each of the first gas discharge ports 51 is 15 [mm²], the opening area of each of the second gas discharge ports 52 is 6 [mm²], the number of the first gas discharge ports 51 is 3 [pieces], and the number of the second gas discharge ports 52 is 12 [pieces]. In Example 6, the opening area of each of the first gas discharge ports 51 is 10 [mm²], the opening area of each of the second gas discharge ports 52 is 8 [mm²], the number of the first gas discharge ports 51 is 3 [pieces], and the number of the second gas discharge ports 52 is 12 [pieces]. In Examples 4 to 6, the burst pressure of the first gas discharge ports 51 and the burst pressure of the second gas discharge ports 52 are adjusted by the difference in the opening areas of the discharge ports.

For Examples 7 to 9, the number of the first gas discharge ports 51 and the number of the second gas discharge ports 52 are different from each other and the opening area per each of the first gas discharge ports 51 and the opening area per each of the second gas discharge ports 52 are different from each other. In Example 7, the opening area of each of the first gas discharge ports 51 is 12 [mm²], the opening area of each of the second gas discharge ports 52 is 12 [mm²], the number of the first gas discharge ports 51 is 6 [pieces], and the number of the second gas discharge ports 52 is 6 [pieces]. In Example 8, the opening area of each of the first gas discharge ports 51 is 10 [mm²], the opening area of each of the second gas discharge ports 52 is 10 [mm²], the number of the first gas discharge ports 51 is 5 [pieces], and the number of the second gas discharge ports 52 is 5 [pieces]. In Example 9, the opening area of each of the first gas discharge ports 51 is 8 [mm²], the opening area of each of the second gas discharge ports 52 is 8 [mm²], the number of the first gas discharge ports 51 is 8 [pieces], and the number of the second gas discharge ports 52 is 8 [pieces]. In Examples 7 to 9, the burst pressure of the first gas discharge ports 51 and the burst pressure of the second gas discharge ports 52 are adjusted by the difference in the tensile strength of the sealing tape closing the discharge ports.

FIG. 19 shows the sum of the opening areas of the gas discharge ports opened in the assembled state for different values of the angular range θ3 of the first region 3a covered by the mounting member 30 in each of Examples 1 to 9. As shown in FIG. 19, in each of Examples 1 to 9, the sum of the opening areas of the gas discharge ports opened in the assembled state is calculated for the case of θ3=270°, θ3=240°, θ3=180°, θ3=120°, and θ3=90°.

Equations (2) to (4) below were used to calculate the sum of the opening areas of the gas discharge ports opened in the assembled state.

$$[\text{Sum of opening areas of first gas discharge ports 51 opened in assembled state [mm}^2]] = \\ [\text{Sum of opening areas of all first gas discharge ports 51 [mm}^2]] * \\ \theta 3[°]/360° \qquad (2)$$

$$[\text{Sum of opening areas of second gas discharge ports 52 opened in assembled state [mm}^2]] = \\ [\text{Sum of opening areas of all second gas discharge ports 52 [mm}^2]] * \\ \theta 3[°]/360° \qquad (3)$$

-continued

[Sum of opening areas of first gas discharge ports 51 and second gas discharge ports 52 opened in assembled state [mm²]] = [Sum of opening areas of first gas discharge ports 51 opened in assembled state [mm²]] + [Sum of opening areas of second gas discharge ports 52 opened in assembled state [mm²]]     (4)

In the stand-alone state, all of the first gas discharge ports 51 are opened by the pressure of the combustion gas, and thus, as shown in FIG. 19, the sum of the opening areas of the first gas discharge ports 51 opened in the stand-alone state is equal to the sum of the opening areas of all of the first gas discharge ports 51. Furthermore, none of the second gas discharge ports 52 are opened in the stand-alone state, and thus, as shown in FIG. 19, the sum of the opening areas of the second gas discharge ports 52 opened in the stand-alone state is 0 [mm²].

Here, when the opening area of each of the first gas discharge ports 51 is defined as X and the number of the first gas discharge ports 51 is defined as Y, the opening area of each of the second gas discharge ports 52 may be ½X, the number of the second gas discharge ports 52 may be 2Y, and the first region 3a covered by the cover portion 301 may be ½ of the entire circumference of the peripheral wall portion 31. Thus, the sum of the opening areas of the first gas discharge ports 51 opened when the igniter 1 is actuated in the stand-alone state can be set equal to the sum of the opening areas of the first gas discharge ports 51 and the second gas discharge ports 52 opened when the igniter 1 is actuated in the assembled state. In FIG. 19, the above-described condition is satisfied in the case of θ3=180° in Example 2.

When the opening area of each of the first gas discharge ports 51 is defined as X and the number of the first gas discharge ports 51 is defined as Y, the opening area of each of the second gas discharge ports 52 may be ½X, the number of the second gas discharge ports 52 may be 4Y, and the first region 3a covered by the cover portion 301 may be ⅔ of the entire circumference of the peripheral wall portion 31. Also in this case, the sum of the opening areas of the first gas discharge ports 51 opened when the igniter 1 is actuated in the stand-alone state can be set equal to the sum of the opening areas of the first gas discharge ports 51 and the second gas discharge ports 52 opened when the igniter 1 is actuated in the assembled state. In FIG. 19, the above-described condition is satisfied in the case of θ3=240° in Example 3.

Furthermore, the opening area of each of the first gas discharge ports 51 may be equal to the opening area of each of the second gas discharge ports 52, the number of the first gas discharge ports 51 may be equal to the number of the second gas discharge ports 52, and the first region 3a covered by the cover portion 301 may be ½ of the entire circumference of the peripheral wall portion 31. Also in this case, the sum of the opening areas of the first gas discharge ports 51 opened when the igniter 1 is actuated in the stand-alone state can be set equal to the sum of the opening areas of the first gas discharge ports 51 and the second gas discharge ports 52 opened when the igniter 1 is actuated in the assembled state. In FIG. 19, the above-described condition is satisfied in the case of θ3=180° in Examples 7 to 9.

As described above, in the case of θ3=180° in Example 2, θ3=240° in Example 3, and θ3=180° in Examples 7 to 9, the sum of the opening areas of the first gas discharge ports 51 opened when the igniter 1 is actuated in the stand-alone state is equal to the sum of the opening areas of the first gas discharge ports 51 and the second gas discharge ports 52 opened when the igniter 1 is actuated in the assembled state. That is, the sum of the opening areas of the gas discharge ports 5 opened in the stand-alone state is equal to the sum of the opening areas of the gas discharge ports 5 opened in the assembled state. According to such a configuration, the difference in output performance between the stand-alone state and the assembled state can be further reduced.

Here, when it is desired that only the first gas discharge ports 51 are opened and the second gas discharge ports 52 are not opened in the stand-alone state, it is necessary to provide a difference of not less than a certain degree between the opening pressure of the second gas discharge ports 52 and the opening pressure of the first gas discharge ports 51. On the other hand, when it is desired to open both the first gas discharge ports 51 and the second gas discharge ports 52 disposed in the second region 3b which is not covered by the cover portion 301 in the assembled state, it is necessary to maintain the difference within a certain degree between the opening pressure of the second gas discharge ports 52 and the opening pressure of the first gas discharge ports 51. For example, it is conceivable that the sum of the opening areas of the first gas discharge ports 51 opened when the igniter 1 is actuated in the assembled state is half of the sum of the opening areas of the first gas discharge ports 51 opened when the igniter 1 is actuated in the stand-alone state. When the internal pressure of the combustion chamber 4 is calculated by considering only the area ratio, it can be considered that the internal pressure of the combustion chamber 4 assumed in a case where only the first gas discharge ports 51 in the second region 3b among the plurality of gas discharge ports 5 are opened when the igniter 1 is actuated in the assembled state, is twice the internal pressure of the combustion chamber 4 when the igniter 1 is actuated in the stand-alone state. However, the gas is actually generated by the combustion of the gas generating agent 2 for a certain period of time, and thus, it is considered that the ratio of the internal pressures increases to twice or more of the internal pressure of the combustion chamber 4. In consideration of this, the ratio of the opening pressure of the second gas discharge ports 52 to the opening pressure of the first gas discharge ports 51 can be set to about 1.25 to 3.0. Thus, the upper limit of the ratio of the opening pressures may vary depending on the characteristics of the gas generator, and can be set in consideration of the amount of gas generated per unit time.

In view of the above, the number of the some first gas discharge ports 51 of the first gas discharge ports 51 among the plurality of first gas discharge ports 51 that are prevented from opening by the cover portion 301 in the assembled state may be one or more and ⅔ or less of the total number of the plurality of first gas discharge ports 51. Thus, the ratio of the sum of the opening areas of the first gas discharge ports 51 opened when the igniter 1 is actuated in the assembled state to the sum of the opening areas of the first gas discharge ports 51 opened when the igniter 1 is actuated in the stand-alone state is ⅓ or more and less than 1. Furthermore, considering the gas generated in the combustion of the gas generating agent 2, the ratio of the opening pressure of the second gas discharge ports 52 to the opening pressure of the first gas discharge ports 51 can be set to about 1.25 to 6.0.

Other

Suitable embodiments according to the present disclosure have been described above, but each embodiment disclosed in the present specification can be combined with each of features disclosed in the present specification. The embodiments above describe a case in which the technique of the present disclosure is applied to a gas generator using a pyrotechnic method, which includes generating a combustion gas by combustion of a solid gas generating agent as an example. However, the technique of the present disclosure is not limited to the pyrotechnic method. A method used in the gas generator may be a stored gas method in which a pressurized gas accumulated in advance is used as a gas generation source, and the gas is discharged when an igniter is actuated and a gas outlet opened. Alternatively, a hybrid method may be used in which a pyrotechnic method and a stored gas method are combined. In the technique of the present disclosure, the discharge amount of gas is adjusted by a gas discharge port. Therefore, the technique can be suitably used for a gas generator of pyrotechnic type in which the gas discharge port is used to perform choking.

REFERENCE SIGNS LIST

100 . . . Airbag device
10 . . . Airbag
20 . . . Gas generator
30 . . . Mounting member
1 . . . Igniter
2 . . . Gas generating agent (gas generation source)
3 . . . Housing
31 . . . Peripheral wall portion
3a . . . First region
3b . . . Second region
4 . . . Combustion chamber
5 . . . Gas discharge port
51 . . . First gas discharge port
52 . . . Second gas discharge port
6 . . . Sealing tape (closing member)
61 . . . First sealing tape (first closing member)
62 . . . Second sealing tape (second closing member)

The invention claimed is:

1. A gas generator which is configured to be incorporated in an airbag device and supply gas to an airbag for inflating the airbag, the gas generator comprising:
an igniter;
a gas generation source configured to generate the gas upon actuation of the igniter;
a housing accommodating the igniter and the gas generation source inside the housing; and
a plurality of gas discharge ports formed in the housing, the plurality of gas discharge ports being closed by a closing structure prior to the actuation of the igniter, and opened when the closing structure is ruptured by a pressure of the gas generated by the actuation of the igniter, to enable an inside and an outside of the housing to connect with each other, wherein
the plurality of gas discharge ports include a plurality of first gas discharge ports and one or a plurality of second gas discharge ports, the one or each of the plurality of the second gas discharge ports having a higher opening pressure than each of the plurality of the first gas discharge ports,
in an arrangement of the plurality of first gas discharge ports in the housing, in an assembled state in which the gas generator is incorporated in the airbag device, a structure of the airbag device prevents some of the plurality of the first gas discharge ports from opening by the pressure of the gas,
in an arrangement of the one or the plurality of second gas discharge ports in the housing, in the assembled state, the structure of the airbag device does not prevent the one or at least some of the plurality of second gas discharge ports from opening by the pressure of the gas, and
an opening pressure of the plurality of the first gas discharge ports and an opening pressure of the one or the plurality of the second gas discharge ports are set: to cause only the plurality of first gas discharge ports to open by the pressure of the gas among the plurality of the gas discharge ports when the igniter is actuated in a stand-alone state prior to the incorporation of the gas generator into the airbag device; and to cause the first gas discharge ports, excluding the some of the plurality of the first gas discharge ports, and the one or the at least some of the plurality of the second gas discharge ports to open by the pressure of the gas among the plurality of gas discharge ports when the igniter is actuated in the assembled state.

2. The gas generator according to claim 1, wherein a sum of opening areas of the first gas discharge ports opened when the igniter is actuated in the stand-alone state is equal to a sum of opening areas of the first gas discharge ports and the second gas discharge ports opened when the igniter is actuated in the assembled state.

3. The gas generator according to claim 1, wherein the number of the some first gas discharge ports of the first gas discharge ports that are prevented by the structure of the airbag device from opening in the assembled state is one or more and ⅔ or less of a total number of the plurality of first gas discharge ports.

4. The gas generator according to claim 1, wherein the housing includes a peripheral wall portion having a tubular shape,
the plurality of gas discharge ports are formed in the peripheral wall portion,
in the assembled state, a part of a region of the peripheral wall portion in a circumferential direction of the peripheral wall portion is covered by the structure of the airbag device, and
the some first gas discharge ports of the first gas discharge ports are disposed in the region covered by the structure of the airbag device in the assembled state, and the at least some second gas discharge ports of the second gas discharge ports are disposed in a region uncovered in the assembled state.

5. The gas generator according to claim 4, wherein the plurality of gas discharge ports include the plurality of the second gas discharge ports,
the plurality of first gas discharge ports are disposed at equal intervals along the circumferential direction of the peripheral wall portion, and
the plurality of second gas discharge ports are disposed at equal intervals along the circumferential direction of the peripheral wall portion.

6. The gas generator according to claim 5, wherein an opening area of each of the second gas discharge ports is ½X, and
the number of the second gas discharge ports is 2Y, where X is an opening area of each of the first gas discharge ports and Y is the number of the first gas discharge ports; and
a region of the peripheral wall portion covered by the structure of the airbag device is ½ of an entire circumference of the peripheral wall portion.

7. The gas generator according to claim 5, wherein
an opening area of each of the second gas discharge ports is ½X, and
the number of the second gas discharge ports is 4Y, where X is an opening area of each of the first gas discharge ports and Y is the number of the first gas discharge ports, and
a region of the peripheral wall portion covered by the structure of the airbag device occupies ⅔ of an entire circumference of the peripheral wall portion.

8. The gas generator according to claim 5, wherein
an opening area of each of the first gas discharge ports is equal to an opening area of each of the second gas discharge ports,
the number of the first gas discharge ports is equal to the number of the second gas discharge ports, and
a region of the peripheral wall portion covered by the structure of the airbag device occupies ½ of an entire circumference of the peripheral wall portion.

9. The gas generator according to claim 1, wherein
an opening area of each of the second gas discharge ports is smaller than an opening area of each of the first gas discharge ports.

10. The gas generator according to claim 1, wherein
the closing structure includes a first closing structure configured to close the first gas discharge ports and a second closing structure configured to close the second gas discharge ports, the second closing structure being different from the first closing structure, and
a tensile strength of the second closing structure is greater than a tensile strength of the first closing structure.

11. The gas generator according to claim 1, wherein
the plurality of first gas discharge ports are disposed in such an arrangement that a thrust acting on the gas generator is neutralized when the igniter is actuated in the stand-alone state, the thrust being caused by the gas discharged from the plurality of first gas discharge ports.

12. The airbag device comprising the gas generator described in claim 1.

13. A method of operating a gas generator, the gas generator being configured to be incorporated in an airbag device and to supply gas to an airbag for inflating the airbag, the gas generator including:
an igniter;
a gas generation source configured to generate the gas upon actuation of the igniter;
a housing accommodating the igniter and the gas generation source inside the housing; and
a plurality of gas discharge ports formed in the housing, the plurality of gas discharge ports being closed by a closing structure prior to the actuation of the igniter, and opened when the closing structure is ruptured by a pressure of the gas generated by the actuation of the igniter, to allow an inside and an outside of the housing to connect with each other, the method comprising:
forming the plurality of gas discharge ports in the housing, the plurality of gas discharge ports including a plurality of first gas discharge ports and one or a plurality of second gas discharge ports, the one or each of the plurality of the second discharge ports having a higher opening pressure than each of the plurality of the first gas discharge ports,
arranging the plurality of first gas discharge ports in the housing such that, in an assembled state in which the gas generator is incorporated in the airbag device, a structure of the airbag device prevents some of the plurality of first gas discharge ports from opening by the pressure of the gas,
arranging the one or the plurality of second gas discharge ports in the housing such that, in the assembled state, the structure of the airbag device does not prevent the one or at least some of the plurality of second gas discharge ports from opening by the pressure of the gas, and
causing, among the plurality of gas discharge ports, only the plurality of first gas discharge ports to open by the pressure of the gas when the igniter is actuated in a stand-alone state prior to the incorporation of the gas generator into the airbag device, and causing, among the plurality of gas discharge ports, the first gas discharge ports, excluding the some of the plurality of the first gas discharge ports, and the one or the at least some of the plurality of the second gas discharge ports to open by the pressure of the gas when the igniter is actuated in the assembled state.

14. A gas generator, comprising:
a gas generation source configured to generate the gas upon actuation of an igniter;
a housing accommodating the igniter and a gas generation source therein; and
a plurality of gas discharge ports formed in the housing, each of the plurality of gas discharge ports being closed by a closing structure prior to actuation of the igniter, and opened when the closing structure is ruptured by a pressure of the gas generated by the actuation of the gas generation source, the plurality of gas discharge ports including:
first gas discharge ports formed in a first region covered by a structure of an airbag device when the gas generator is assembled in the airbag device and in a second region other than the first region, in an assembled state in which the gas generator is incorporated in the airbag device, the structure of the airbag device prevents some of the first gas discharge ports in the first region from opening by the pressure of the gas, and
a second gas discharge port formed at least in the second region, the second gas discharge port having a higher opening pressure than each of the first gas discharge ports, in the assembled state, the structure of the airbag device does not prevent the second gas discharge port in the second region from opening by the pressure of the gas, wherein
an opening pressure of the first gas discharge ports are set so as only the first gas discharge port formed in the first region and the second region to open by the pressure of the gas when actuated in a stand-alone state prior to incorporating the gas generator into the airbag device, and
an opening pressure of the second gas discharge port in the second region is set so as to open by the pressure of the gas when the igniter is actuated in the assembled state.

* * * * *